Sept. 8, 1931. G. G. CRANE 1,822,645
REMOTE PRESSURE CONTROL SYSTEM FOR GAS PLANTS
Filed May 28, 1930

INVENTOR
GUY G. CRANE
BY George B. Willey
ATTORNEY

Patented Sept. 8, 1931

1,822,645

UNITED STATES PATENT OFFICE

GUY G. CRANE, OF OWOSSO, MICHIGAN

REMOTE PRESSURE CONTROL SYSTEM FOR GAS PLANTS

Application filed May 28, 1930. Serial No. 456,716.

This invention is an improvement in systems for automatically regulating the pressure of gas in a main at the point of supply to the main, the regulation being responsive to fluctuations in pressure at a remote point which is served by said main, the purpose being to maintain uniform gas pressure at such remote point.

It has for its object the provision of a simple, reliable and novel combination of electrical and mechanical instruments which can be economically installed in most gas systems without the need of any special and expensive equipment to make it operative. For instance, I employ a two-wire low-voltage polarized relay system for transmitting the requisite signals from the remote point to the point of supply. This system eliminates the need of specially constructed lines in most instances, as the regular low voltage lines of a telephone company can be leased for the purpose at a low cost. Other types of signal-lines heretofore employed required a three-wire line necessitating special line construction with all the expense and difficulty attendant upon getting a right of way, installing etc.

By using enclosed fluid-contact switches at the remote pressure gauging point and at the gas source, and by the use of low voltages in the control circuits I reduce the danger of fire or explosion if a leakage of gas occurs.

Other objects attained by this invention contributing to the above result will appear in the description of its construction and mode of operation.

Fig. 1 of the drawings is a diagrammatic repersentation of a gas system embodying my invention.

Figure 1:
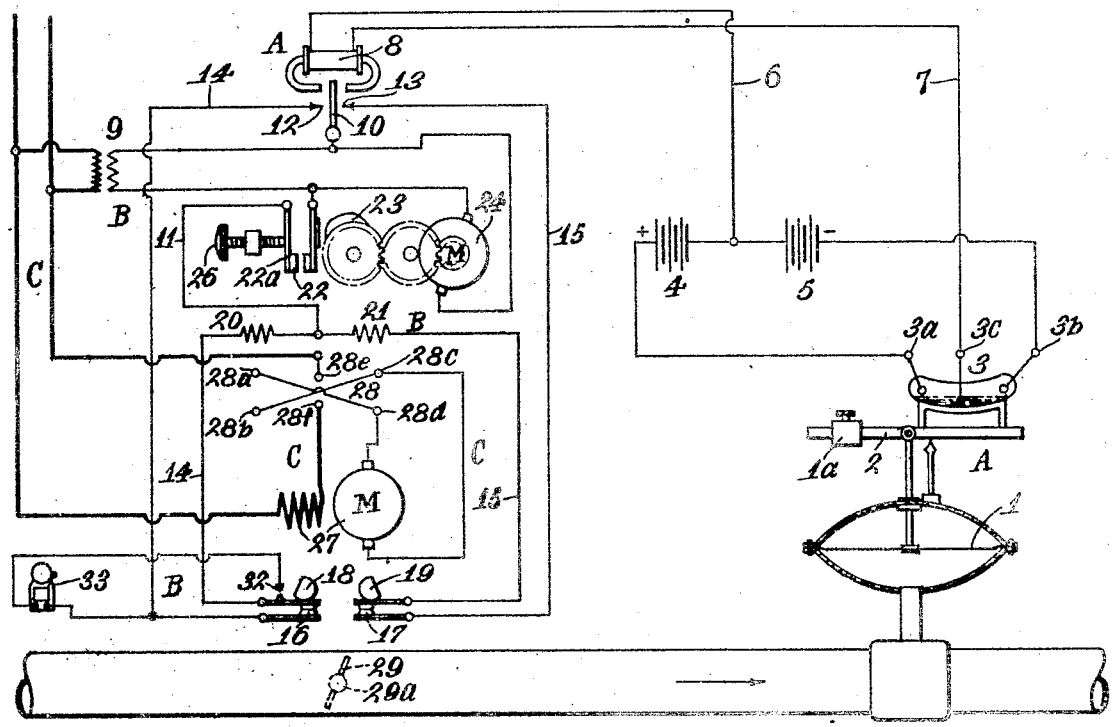

For purposes of description I have divided my invention into sections. Referring to Fig. 1 of the drawings, section A comprises the pressure gauging device and a direct current source and the solenoid of a polarized relay, also a pair of telephone wires. One side of a pressure responsive diaphragm 1 is exposed to the pressure of gas in the main. It is suitably counter-balanced with springs or weights 1a to be in a state of sensitive equilibrium at the pressure which is to be maintained at this point. This diaphragm may be one of several forms. I prefer to use a metallic bellows, which is highly sensitive and produces a large mechanical movement from a small change in gas pressure. It is also gas tight and tends to remain so. The diaphragm actuates a pivoted arm 2 carrying a fluid-contact switch 3, which is provided with three poles 3a, 3b, 3c, so that tilting the switch in one direction makes a contact across poles 3a and 3c and tilting in the other direction connects poles 3b and 3c. A source of direct current is provided at this point. Batteries, or else A. C. rectifiers, 4 and 5, are connected to relay wires 6 and 7 and to the poles of switch 3 so that contact across 3a and 3c charges wire 6 negatively and wire 7 positively, and closing the circuit across 3b and 3c charges them with the opposite polarities. If desired one battery only may be provided, but this necessitates the use of a more expensive pole-changing switch, not shown, to be operated by diaphragm 1. The wires 6 and 7 are connected, at the point of gas supply, to the solenoid of a polarized relay 8, which can be arranged to control the valve-regulating motor either directly in known manner, or else indirectly by controlling an intermediate motor-control circuit.

In the form which I disclose I have preferred to control the motor circuit by an intermediate lower voltage current because danger of arcing and harmful erosion at the various contact points is lessened. This intermediate control circuit, which I have designated as section B, will now be described.

Referring to Fig. 1, numeral 9 indicates a step-down transformer which provides low voltage alternating current for the control circuit. The movable switch arm 10 of the relay 8 is connected to one side of the secondary of the transformer 9, and is deflected in one direction by the relay 8 so as to touch a contact point 12, or in the other direction to touch a contact point 13. Contact point 12 is one end of a leg 14 of the control circuit and point 13 is an end of a second leg 15. Leg 14 includes a limit switch 16 held normally closed by a cam 18 on the shaft 29a of the motor-driven main regulating valve 29, and a solenoid 20. Beyond this solenoid it joins a common leg 11 of the relay circuit. Leg 15 includes a second limit switch 17 normally held closed by a cam 19 on the valve shaft 29a, and a solenoid 21. Beyond solenoid 21 leg 15 joins the common leg 11 of the relay circuit. One of the cams 18 or 19 is indexed on the valve shaft 29a so that its limit switch, 16 or 17, opens when the valve is entirely closed, the other cam is so indexed that its limit switch opens when the valve is open to the desired maximum degree.

In connection with the "open" limit switch, it is sometimes desirable to have a contact 32 which is closed by the opening of the limit switch, for giving a signal to indicate that more gas pressure is needed at the valve 29. The booster pumps are then started by the operator of the gas supply station and the gas pressure is thereby increased until the normal partial opening of the valve will pass enough gas to maintain the requisite pressure at the diaphragm 1. Instead of having this contact give a signal, it may be used to start the booster pumps automatically, in known manner. I have shown contact 32 in circuit with a bell 33 to give an audible signal.

In leg 11 of the control circuit B is a normally-open switch 22 which is closed at regular intervals of time by a cam 23, driven through reduction gearing by a small motor 24. A screw 26 bearing against the stationary arm 22a of switch 22 is provided for adjusting the duration of each contact made by cam 23. This I term the interrupter. Motor 24 may of course get its power from the main power circuit, instead of from the low voltage transformer, as I have shown here.

Section C of the system comprises the power circuit which supplies current, in this instance, 110 V. single-phase A. C., to the valve-operating motor 27, as shown in Fig. 1. A motor-reversing switch 28 is caused to bridge contacts 28a to 28e and 28b to 28f by the action of solenoid 20 and to bridge contacts 28c to 28e and 28d to 28f by the action of solenoid 21.

The gas valve 29 is of known construction and is connected with motor 27 by the usual gearing employed in such installations. The valve and its operating mechanism may be of any suitable or well-known construction, such as a gate valve, a globe valve or a so-called butterfly valve. It may be the throttle valve of a steam engine or turbine that drives a gas pump. The motor mechanism for operating the valve is a well-known device already on the market and can be applied to any standard type of valve now in common use.

The operation of my system is as follows:
Suppose that the pressure at the remote pressure-measuring station drops below the predetermined minimum. The diaphragm 1 drops and switch 3 is tilted, closing the D. C. relay circuit across contacts 3a and 3c and putting power source 4 into the circuit. Wire 7 of the circuit becomes positive, wire 6 negative, and at the control point the relay switch arm 10 is deflected so as to touch, say, contact 12, and closes the A. C. control circuit over leg 14 through solenoid 20 and leg 11. The relay arm 10 will maintain this circuit until the pressure at the remote pressure measuring station rises and causes the D. C. relay circuit to be broken.

Assuming that limit switch 16 is closed, current will now pass through solenoid 20 each time cam 23 closes switch 22. Solenoid 20 closes the power circuit across the reversing switch terminals, as above described, causing the motor 27 to open the valve 29. The intermittent closings of switch 22 give the valve a step-by-step motion, made up of a short period of movement and a relatively long period of waiting. This period of waiting is to enable the change in pressure caused by the movement of the valve to travel through the mains from the supply source to the remote pressure-measuring station, and its length is set according to the distance between the remote station and the valve, and other practical considerations of gas distribution practice.

If the pressure at the remote station comes up to normal after one small adjustment of the valve, the relay circuit will be opened, and the next closing of switch 22 will not cause the valve motor to operate. If this one step of opening does not cause the pressure to rise to normal, the relay 8 will keep the leg 14 in closed circuit with solenoid 20 and the valve motor will operate two or three more consecutive times to open the valve, until the pressure has come to normal. Should the repeated operations of the valve move it to a wide open position without furnishing the required pressure at the measuring station, the limit switch 16 will open, the drive motor will stop, and if provision therefor has been made as above mentioned the opening of the limit switch will operate a signal as a warning that more pressure is needed on the main.

An excess of pressure at the measuring station will raise the diaphragm 1 and tilt the mercury switch 3 in the opposite direction connecting battery 5 into the relay circuit, wire 6 will become positive, wire 7 negative, and the relay switch arm 10 of the relay 8 will be deflected to the right and will touch terminal 13 of leg 15 of the control circuit.

Each closing of switch 22 by the cam 23 closes the control circuit and energizes solenoid 21. Solenoid 21 causes contacts 28c to 28e and 28d to 28f of switch 28 to be bridged.

The motor 27 then operates to close the valve 29 each time and as long as switch 22 is closed. Step-by-step valve closing motion will continue, as in the case of the opening motion described above, until the diaphragm 1 at the remote station opens the relay circuit. If consumption of gas beyond the remote station should cease, the pressure will build up in the main, the valve 29 will close all the way, opening limit switch 17 and stopping the motor 27.

Figure 2:
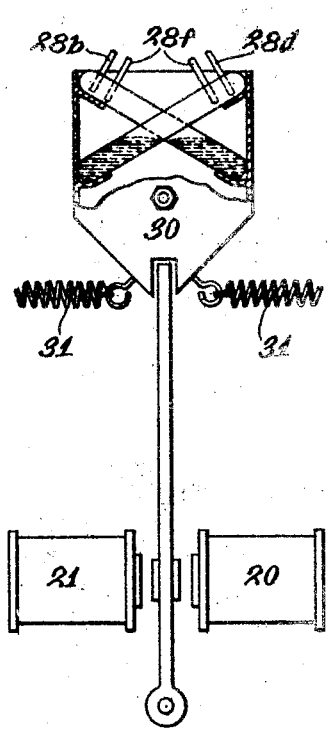
Fig. 2 is a side elevation partly in section of a form of motor-reversing switch used in my invention.
Figure 3:
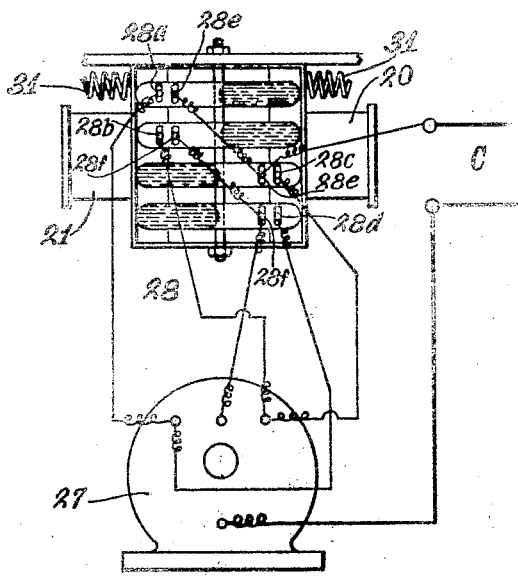
Fig. 3 is a top plan view of the switch shown in Fig. 2.

To eliminate arcing at contact points, I preferably employ a liquid contact switch, one form of which I show in Figs. 2 and 3. This switch 28 comprises four mercury-contactor tubes mounted on a block or support 30. Block 30 is pivotally mounted so as to be tilted in one direction by the action of solenoid 20 to bridge the contacts 28a—28e and 28b—28f in one pair of tubes and is tilted in the opposite direction to bridge the contacts 28c—28e and 28d—28f in the other pair of tubes when solenoid 21 is energized. Block 30 is held upright by springs 31 so that no contacts are made when neither solenoid is energized. The contacts in each tube are so wired that tilting the block 30 to the left closes the circuit through 28a, 28e and 28b to 28f. Tilting the block 30 to the right causes a current to be established through 28c to 28e and 28d to 28f.

By the term "reversing-switch" I intend to include all the necessary contacts, contact bridgers, mechanism, or sets of mechanism for effecting the connections for operating the valve motor 27 in either direction. The sets of contactor tubes for each direction of valve-motor rotation may be combined mechanically into a unit, as shown in Figs. 2 and 3 of the drawings, or they may be physically independent of each other. Two separately tilted contactor supports may be used, connected to each other electrically only, and each being tilted by the action of one of the solenoids 20, 21. I do not wish to be limited to the particular embodiment of reversing switch which I show and describe in detail, as other known forms may be employed without departing from the invention as claimed.

By the term "source of gas" in the subsequent claims I mean a gas manufacturing plant, or a high-pressure transmission main from which a net-work of low-pressure local distribution mains are to be supplied. In the latter case the motor-operated valve 29 will be located at the inlet to the low pressure net-work.

By the means above described a highly efficient remote control system for gas distribution net-works has been produced, wherein all the elements co-act and contribute to the desired results. The system throughout is electro-magnetic as distinguished from those systems in which mechanically actuated gearing and escapements are employed for timing the valve movements. Existing telephone lines can be employed on account of the two-wire direct current system used and the low-voltage relay circuit arrangement. All apparatus employed is of known construction and design and the various elements can all be purchased at the present time in the open market, hence the cost of upkeep and the risk of interruption to service for renewals and repairs, are minimized. Danger of gas explosion is reduced to a minimum by reason of the inclusion in the main combination of the improved diaphragm and liquid-contactor valve.

Having thus described my invention, what I claim and desire to secure by Letters Patent is:

1. A gas pressure-regulating system comprising in combination a source of gas, a main for carrying the gas to a point remote from the source, a valve in said main at said source, a pressure-responsive diaphragm in communication with the main at said remote point, a two-wire circuit extending from said source to said remote point, a source of direct current, a switch operatively connected to said diaphragm and arranged to connect said source of direct current to said two-wire circuit when the gas pressure exceeds or drops below that to be maintained, so that the current sent over said circuit is of one polarity when the gas pressure at the remote point is too low, and of the opposite polarity when the gas pressure is too high, a polarized relay connected in said two-wire circuit at said source of gas, a control circuit located at said source of gas and having three legs, either of the first two legs being arranged to be closed by the polarized relay, the third leg connected to the first two and serving as a common return lead, a source of electric current connected to a switch arm of said polarized relay and to the third leg of said control circuit, two solenoids, each connected in series with one of said first two legs, a switch in said third leg, automatic means for alternately opening and closing said switch at regular time intervals, an electric motor operatively connected with said valve in the gas main, a power line for said motor, a motor-reversing switch connected between the motor and said power line, said reversing switch arranged to be closed by one of said solenoids in the control circuit to operate the motor to close said valve, and to be closed by the other of said solenoids to operate the motor to open said valve.

2. In combination with a source of gas supply and a gas-distributing conduit system, a regulating valve at said source, a reversible valve-actuating electric motor in a power circuit, a pressure-measuring station remote from said gas source, two electric conductors connecting said gas source and station, two sources of direct electric current at said station arranged to establish a relay-actuating circuit in either direction in said conductors, a polarized relay operatively connected to control the power circuit of said motor, said relay adapted to be actuated by the current in said relay circuit to cause said reversible motor to run in either direction according to the polarity of the current, a gas-actuated diaphragm in communication with the gas conduit system at said remote section, a three-pole liquid contact switch operable by said diaphragm in one direction under increasing gas pressure and in the opposite direction under decreasing pressure, said switch arranged to transmit the current from either of said two sources of current to said conductors, a constantly-operating interrupter for the power circuit of said valve-actuating motor, and adjusting means for said interrupter arranged for varying the duration of each period of operation of said valve motor.

3. A gas pressure-regulating system comprising in combination a source of gas, a main for carrying the gas to a point remote from the source, a valve in said main at said source, a reversible electric motor arranged to operate said valve, a pressure-responsive diaphragm in communication with said main at said remote point, a two-wire circuit extending from said source to said remote point, a source of direct current, a switch operatively connected to said diaphragm and arranged to connect said source of direct current to said pair of wires when the gas pressure exceeds or drops below that to be maintained so that the current sent over the pair of wires is of one polarity when the gas pressure is too low, and of the opposite polarity when the pressure is too high, a polarized relay connected to the two-wire circuit at the source of supply, means controlled by said relay for causing said reversible motor to close or open said valve according to the polarity of the direct current flowing through said relay, means independent of said relay control means constantly operating to interrupt the power to said reversible motor at predetermined time intervals.

4. A gas pressure-regulating system comprising in combination a source of gas, a main for carrying the gas to a point remote from the source, a valve in said main at said source, a motor arranged to operate said valve in either direction, a pressure-responsive diaphragm in communication with said main at said remote point, a two-wire circuit extending from said source to said remote point, a source of direct current, a switch operatively connected to said diaphragm and arranged to connect said source to said pair of wires when the gas pressure exceeds or drops below that to be maintained, so that the current sent over the pair of wires is of one polarity when the gas pressure is too low, and of the opposite polarity when the pressure is too high, a polarized relay connected to the two-wire circuit near the source of supply, means controlled by said relay for causing said valve-actuating motor to close or open said valve according to the polarity of the direct current flowing through said relay, means independent of said relay control means constantly operating to interrupt the actuation of said valve at predetermined time intervals.

In testimony whereof, I affix my signature.

GUY G. CRANE.